US012151269B1

(12) United States Patent
Carter

(10) Patent No.: US 12,151,269 B1
(45) Date of Patent: Nov. 26, 2024

(54) LANCING SAFETY CAP APPARATUS

(71) Applicant: TRI-STATE ENVIRONMENTAL, LLC, Houma, LA (US)

(72) Inventor: Anthony Scott Carter, Petal, MS (US)

(73) Assignee: TRI-STATE ENVIRONMENTAL, LLC, Houma, LA (US)

( * ) Notice: Subject to any disclaimer, the term of this patent is extended or adjusted under 35 U.S.C. 154(b) by 38 days.

(21) Appl. No.: 18/149,132

(22) Filed: Jan. 2, 2023

Related U.S. Application Data

(63) Continuation of application No. 17/181,361, filed on Feb. 22, 2021, now Pat. No. 11,541,436, which is a continuation of application No. 15/974,432, filed on May 8, 2018, now Pat. No. 10,926,304.

(60) Provisional application No. 62/503,126, filed on May 8, 2017.

(51) Int. Cl.
*B08B 13/00* (2006.01)
*B08B 9/043* (2006.01)
*E21B 41/00* (2006.01)

(52) U.S. Cl.
CPC ............ *B08B 9/0433* (2013.01); *E21B 41/00* (2013.01); *B08B 2209/032* (2013.01); *B08B 2209/04* (2013.01)

(58) Field of Classification Search
None
See application file for complete search history.

(56) References Cited

U.S. PATENT DOCUMENTS

| | | | |
|---|---|---|---|
| 1,340,295 | A | 5/1920 | Russell |
| 1,432,649 | A | 10/1922 | Wessels |
| 1,704,364 | A | 3/1929 | Markley |
| 2,117,648 | A | 5/1938 | Bottorf |
| 4,518,041 | A | 5/1985 | Zublin |
| 5,159,956 | A | 11/1992 | Kurihara |
| 5,217,166 | A | 6/1993 | Schulze et al. |
| 5,323,797 | A | 6/1994 | Rankin |
| 5,964,414 | A | 10/1999 | Hardy et al. |
| 6,158,076 | A | 12/2000 | Rutkowski et al. |
| 6,325,305 | B1 | 12/2001 | Kuhlman et al. |
| 6,684,706 | B2 | 2/2004 | Knight et al. |
| 7,040,331 | B2 | 5/2006 | Garman et al. |
| 8,118,091 | B2 | 2/2012 | Baker et al. |
| 8,381,816 | B2 | 2/2013 | Leduc et al. |
| 9,844,803 | B1 | 12/2017 | Carter |
| 11,541,436 | B1 | 1/2023 | Carter |
| 2004/0050553 | A1 | 3/2004 | Edvardsen et al. |

(Continued)

*Primary Examiner* — Eric W Golightly

(74) *Attorney, Agent, or Firm* — Garvey, Smith & Nehrbass, Patent Attorneys, L.L.C.; Vanessa M. D'Souza; Charles C. Garvey, Jr.

(57) ABSTRACT

A safety cap fitting apparatus for use in cleaning a piping system, the apparatus comprising: a) a housing having a hollow bore; b) a flange adapter on said housing, the flange adapter having a flange adapter central axis; and c) a pipe nipple extension mounted to and extending from the housing; wherein the pipe nipple extension has a pipe nipple extension central axis that forms an angle with the flange adapter central axis; wherein the housing has an outer wall, a distal end that attaches to the flange adapter, and a proximal end that has an opening to the hollow bore; and wherein the pipe nipple extension attaches to the housing providing a second opening to the hollow bore, the pipe nipple extension having an outer wall, an inner bore, a distal end that attaches to the housing, and a proximal end that is an open end.

16 Claims, 21 Drawing Sheets

(56) References Cited

U.S. PATENT DOCUMENTS

| | | | |
|---|---|---|---|
| 2011/0052328 | A1 | 3/2011 | Frerich et al. |
| 2014/0060849 | A1 | 3/2014 | Pathak et al. |

LANCING SAFETY CAP APPARATUS

CROSS-REFERENCE TO RELATED APPLICATIONS

This application is a continuation of U.S. patent application Ser. No. 17/181,361, filed 22 Feb. 2021 (issued as U.S. Pat. No. 11,541,436 on 3 Jan. 2023), which is a continuation of U.S. patent application Ser. No. 15/974,432, filed on 8 May 2018 (issued as U.S. Pat. No. 10,926,304 on 23 Feb. 2021), which claims the benefit of U.S. Provisional Patent Application No. 62/503,126, filed 8 May 2017; priority of U.S. Provisional Patent Application No. 62/503,126, filed 8 May 2017; U.S. patent application Ser. No. 15/974,432, filed on 8 May 2018; and U.S. patent application Ser. No. 17/181,361, filed 22 Feb. 2021, is hereby claimed.

Incorporated herein by reference are U.S. Provisional Patent Application No. 62/503,126, filed 8 May 2017: U.S. Provisional Patent Application No. 62/068,441, filed 24 Oct. 2014: U.S. Provisional Patent Application No. 62/164,978, filed 21 May 2015: U.S. Provisional Patent Application No. 62/164,985, filed 21 May 2015: U.S. Provisional Patent Application No. 62/191,991, filed on 13 Jul. 2015: U.S. Provisional Patent Application No. 62/245,697, filed 23 Oct. 2015: U.S. Provisional Patent Application No. 62/329,341, filed 29 Apr. 2016; U.S. patent application Ser. No. 15/162,460, filed on 23 May 2016; and U.S. patent application Ser. No. 15/162,540, filed on 23 May 2016.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to safety caps for lancing procedures, and a method of using said safety caps for cleaning of piping systems. More particularly, the present invention relates to an improved safety cap fitting apparatus for use in cleaning a selected piping system (e.g., oil and gas well pipes to be cleaned onsite) that allows for the cap and lancing tools to be used in hard-to-reach places.

2. General Background of the Invention

Pipe systems are typically used to carry material such as drilling mud on oil and gas drilling platforms. Drilling mud is a thick and viscous material that can adhere to the inner surface of the pipe bore and its fittings over time. Eventually this caked on drilling mud must be removed because it reduces the effective inside diameter of the pipe, thus reducing flow rates.

BRIEF SUMMARY OF THE INVENTION

The apparatus of the present invention is an improved safety cap fitting apparatus for enabling piping systems such as oil and gas well pipes to be cleaned onsite and that allows for the cap and lancing tools to be used in hard-to-reach places. The present invention also includes an improved method of using the safety cap fitting apparatus to clean pipes onsite and in hard-to-reach places.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
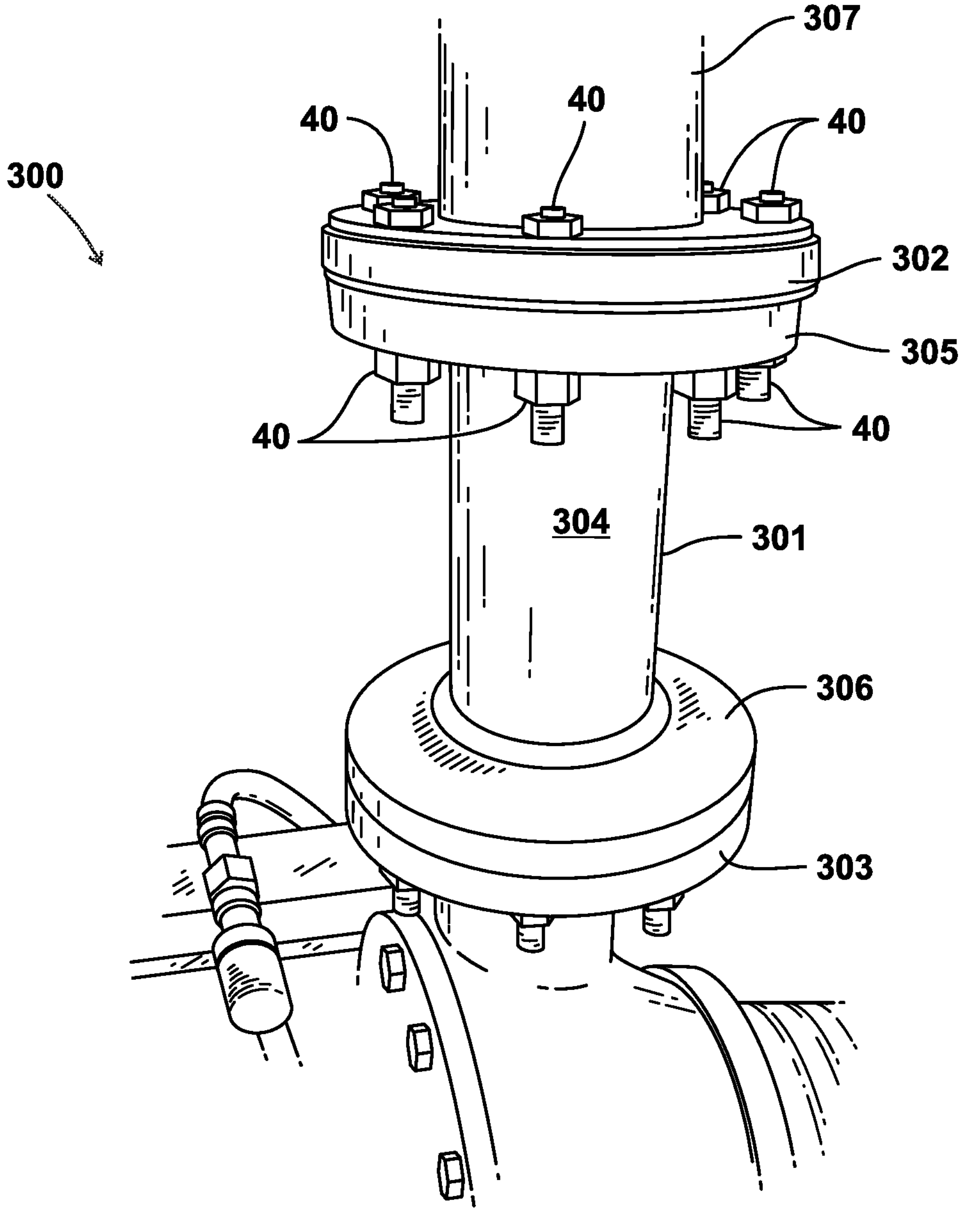
FIG. 1 (prior art)
FIG. 1 is a perspective view of a piping system prior to removal of a pipe spool piece and placement of the apparatus of the present invention.

FIG. 1 shows a piping system 300 to be cleaned. Piping system 300 may have a removable piping segment or spool piece 301. Spool piece 301 can be comprised of pipe flanges 305, 306 that are welded or otherwise connected to a section 304 (or sections) of pipe or tubular material. The spool piece 301 can also include one or more fittings such as one or more elbows, tees, valves or other fitting or fittings. Spool pieces 301 are typically shop prepared (e.g., welded) and then field assembled to other spool pieces or lengths of pipe or fittings or valves or other piping components (e.g., using bolted connections 40). Such spool pieces 301 are well known in the art. Once a spool piece 301 is removed, flanges 302, 303 of piping system 300 are exposed. Piping system 300 includes piping to be cleaned such as pipe section 307. Pipe section 307 can be connected (e.g., welded) to flange 302. Adapter 21 of fitting 10 may then be attached to a selected flange 302 or 303 by bolts or bolted connections 40. Preferably, a gasket or ring type gasket 13, 49 is placed between pipe flage 302, 303, 305, 306 and adapter 21, 42 as shown in FIGS. 2, 3, 5, 12, and 14. Fitting 10 then enables cleaning of the piping system 300 using cleaning tool 11 and lance line 16. Flanges 302, 303, 305, 306 are typically commercially available pipe flanges (e.g., www.coastalflange.com) such as, for example, weld neck flanges with raised face or ring type joint (RTJ) seals.

FIGS. 2-11 show a preferred embodiment of the apparatus of the present invention, designated generally by the numeral 10. FIGS. 12-23 show an alternate embodiment, designated by the numeral 10A. Safety cap fitting apparatus 10 may be used for cleaning or repairing piping or connecting equipment. Safety cap fitting apparatus 10 enables access to the interior of the piping system to be cleaned with a cleaning tool 11 and a lance line 16 that supplies cleaning fluid under pressure to the cleaning tool 11. Cleaning tool 11 can be a pressure washing tool. Such pressure washing tools are commercially available such as those sold by Stone Age Tools of Durango, Colorado (www.stoneagetools.com). Preferably, a pump is used to send high pressure cleaning fluid to tool 11 via lance line 16. Lance line 16 carries high pressure cleaning fluid to cleaning tool 11, receiving such fluid from a high pressure pump (e.g., 3000-10,000 psi).

The improved configuration of the lance-line clean-out safety cap fitting 10 of the present invention provides for possible access where space may be limited or unavailable. Fitting or safety cap fitting apparatus 10 has an adapter or flange 21 which is connected (e.g., welded) to housing or body 19. Flange or adapter 21 enables easy attachment of fitting 10 to a pipe flange 302, 303 that is part of a piping system 300 or other system where pipe flanges are used (see FIG. 1). Housing 19 is hollow, providing interior, cavity or bore 20 surrounded by wall 24. Preferably, housing 19 is about 6-12 inches in length and is elbow or macaroni shaped having a 90° turn as shown in FIGS. 2-11. However, any size suitable for a given location can be used. Housing 19 has proximal end portion 25 and distal end portion 26. Pipe nipple or tube extension 28 can be connected to housing 19, wall 24 with weld 27. Pipe nipple or tube extension 28 has distal end portion 29 and proximal end portion 30. Weld 27 is at proximal end portion 30 (see FIG. 4). Preferably pipe nipple or tube extension 28 is about 6-12 inches in length and has an inside diameter of approximately 2-12 inches. However, any size suitable for a given location can be used.

Camlock fitting 31 can connect to pipe nipple/tube extension 28 with a threaded connection at 32 (e.g., NPT threading with pipe thread seal tape). Fitting 31 can provide camlock ears 33, 34. Pipe nipple or tube extension 28 has an internal bore 35 that is in communication with bore or interior 20 of housing 19. Housing 19 has catch cylinder 23. Preferably, proximal end portion 22 of cleanout stem/catch cylinder 23 is provided with hose stop plate or bushing 36. Plate 36 has opening 37 that is in communication with cleanout stem 23 bore/interior 38. Lance line 16 has a hose stop 63 that is preferably placed about 6-12 inches from the cleaning tool 11.

Figure 4:
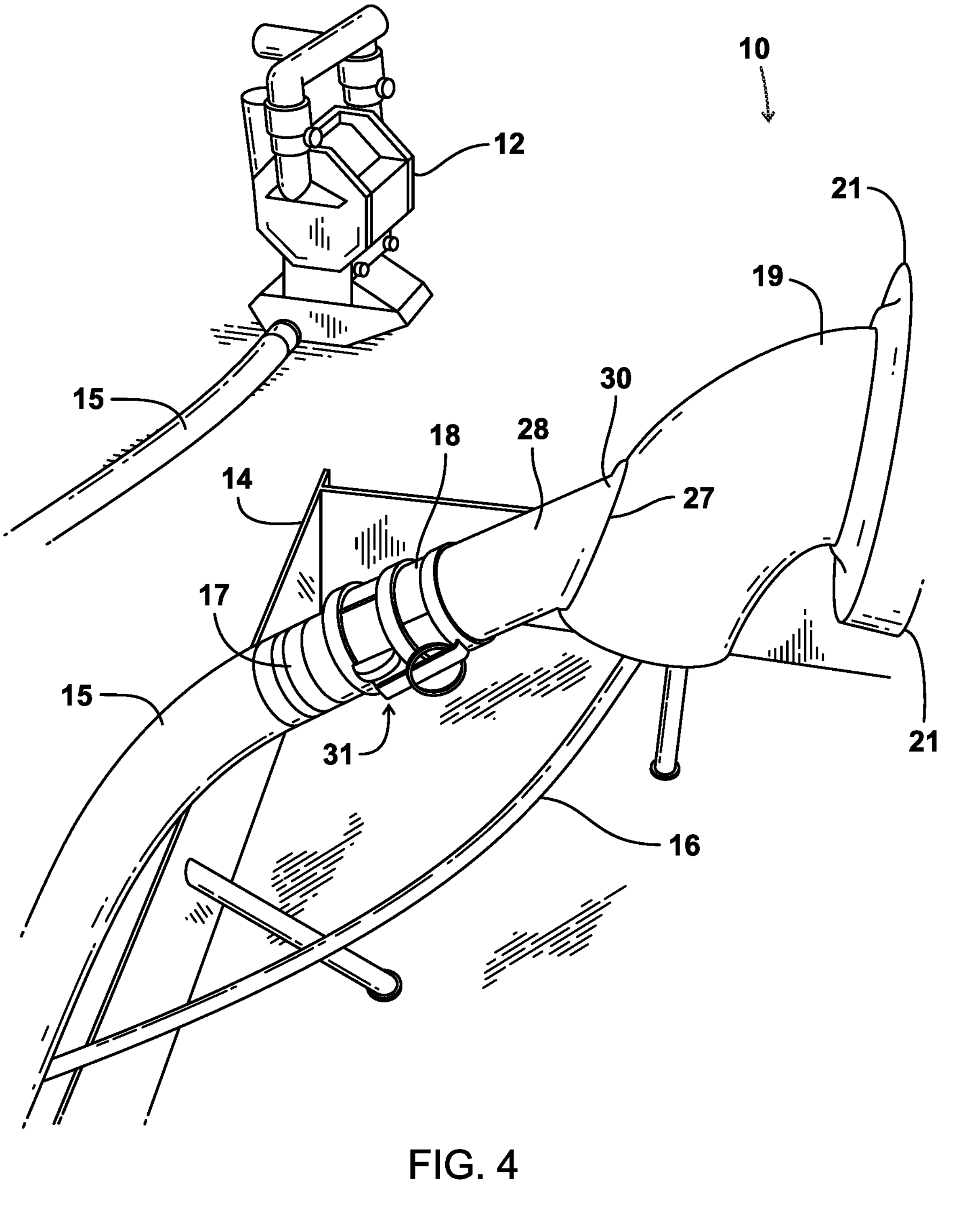
FIG. 4 is a perspective view of a preferred embodiment of the apparatus of the present invention.

Safety cap fitting 10 may include a quick connect, quick disconnect connection such as a camlock fitting 31, preferably configured for connecting to a transfer hose 15 which is connected to pump 12 (see FIG. 4). Pump 12 can be a diaphragm pump or any pump that has the ability to connect with suction line 15. Camlock fitting 31 would connect to a male fitting 17 on hose 15. Camlock fitting 31 provides a female coupler portion 18 (see FIG. 4). Such Camlock fittings 31 that include connectable parts 17, 18 and ears 33, 34 are commercially available (e.g., www.camlockdirect.com).

Figure 5:
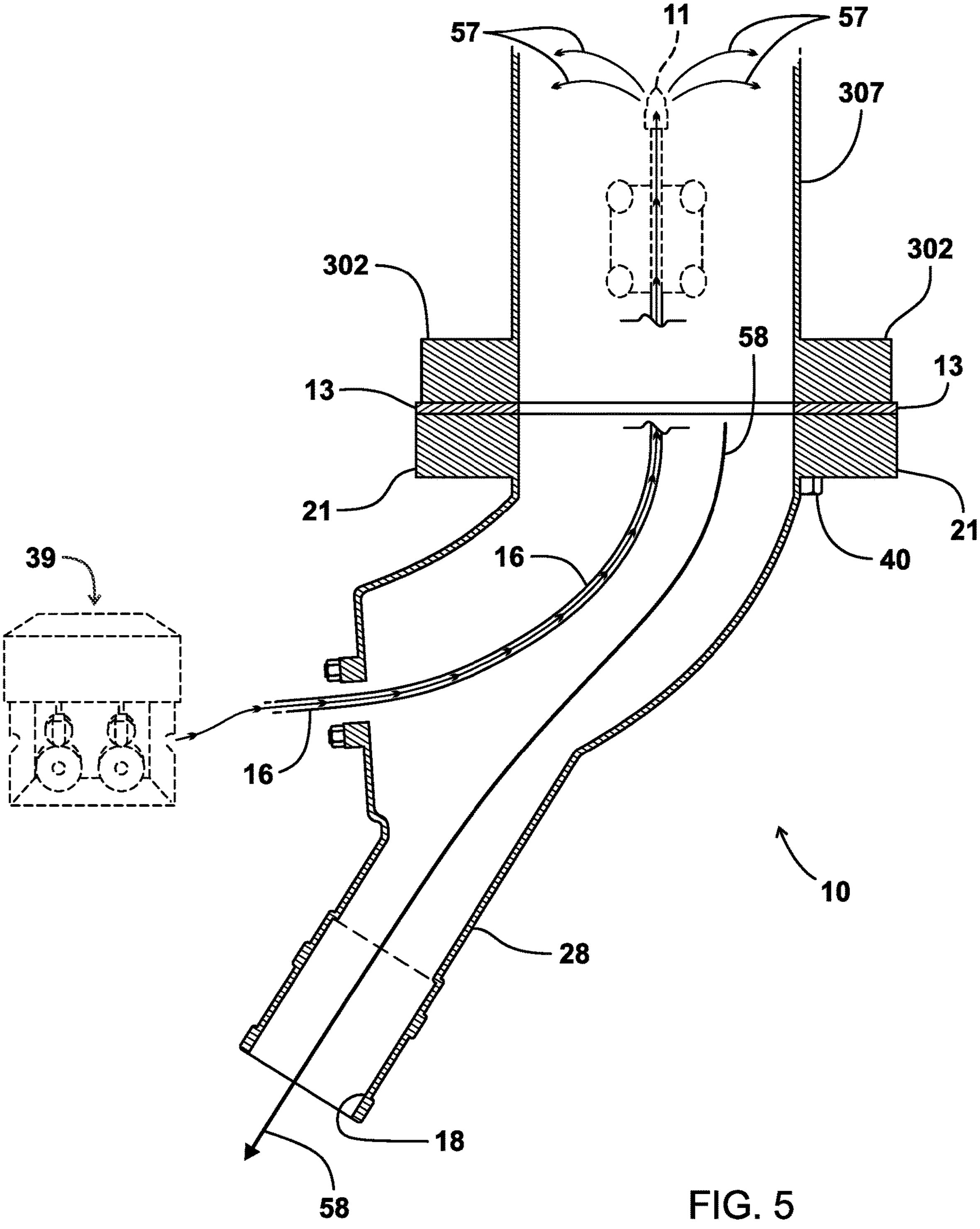
FIG. 5 is a sectional view of a preferred embodiment of the apparatus of the present invention.
Figure 6:
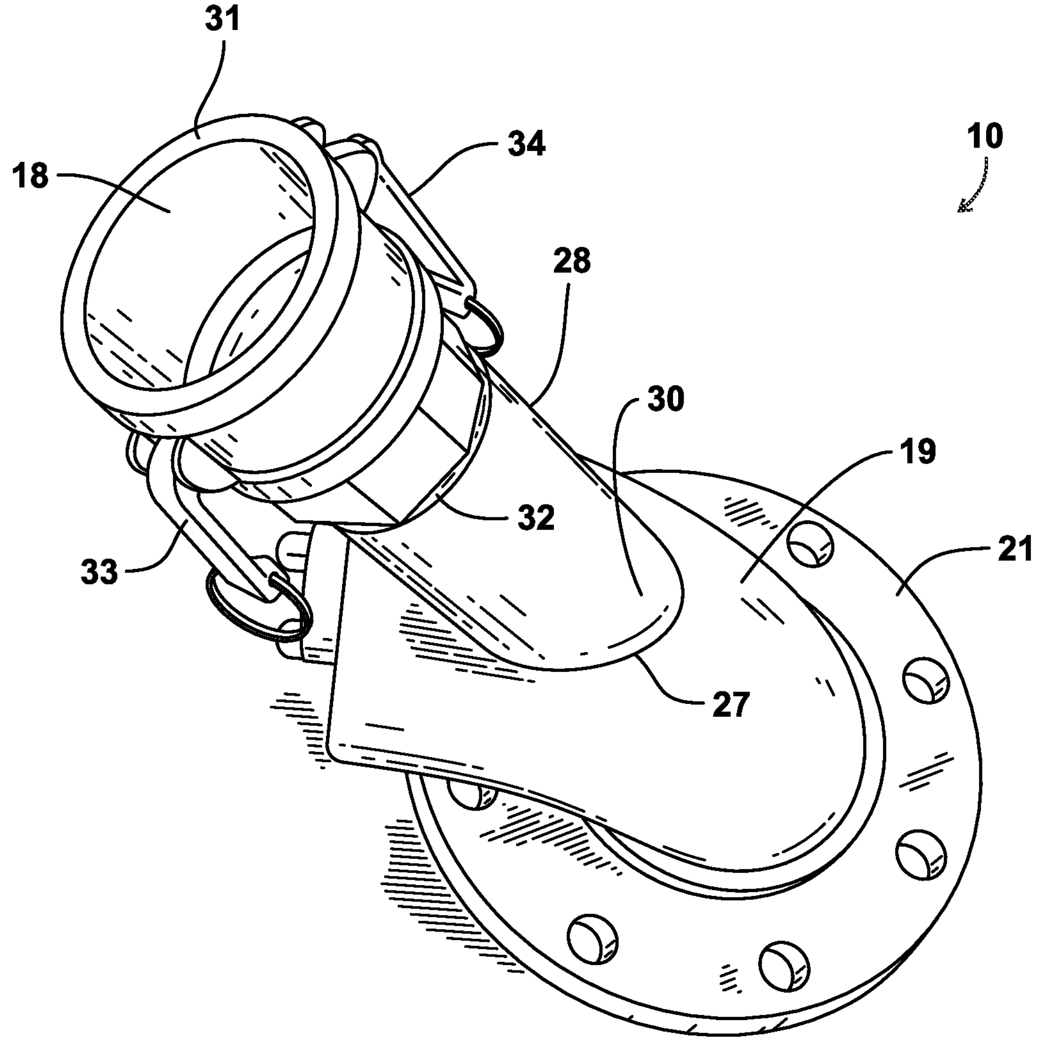
FIG. 6 is a perspective view of a preferred embodiment of the apparatus of the present invention.

Cleaning tool 11 dislodges debris, such as drilling mud, scale, or other unwanted paterial from the inside bore of components of piping system 300, by spraying cleaning fluid into pipe system 300 as shown by arrows 57 in FIG. 5. That debris plus cleaning solution flows to housing 19 or 41 where it is suctioned with line 15 and pump 12. Preferably, lance line 16 is fed through the pipe system 300 using a hose feed device 39, such as STONE AGE AUTOBOX (model ABX-500). Pump 12 and hose/suction line 15 pump cleaning fluid plus removed debris from fitting apparatus 10 for transfer to a tank or other receptacle. Pan, container or catch basin 14 can be placed under fitting 10 as seen in FIG. 4.

Flange or adapter 21 is preferably designed to connect (e.g., bolted connection 40) with a random or selected flange 302, 303 on a piping system 300 to be cleaned. In some embodiments, a high strength, rubber gasket or ring gasket 13 (see FIGS. 2, 3 and 5) may fit between the flange adapter 21 and respective pipe-flange, such as flange 302 or 303. Such gaskets 13 are known and commercially available. Preferably, bolt holes may be machined in flanges 21, 302, 303 to allow bolts or bolted connection 40 to pass through both flanges 21, 302 (or 303), thus fastening the cap fitting 10 at adapter 21 to the selected flange 302, 303. Hose stop 36 and opening 37 may be sized and shaped to catch clamps or other enlarged or laterally projecting parts installed on tool 11 or lance hoses 16 to prevent the high-pressure tool 11 from exiting the cap fitting 10 via opening 37.

FIGS. 12-23 show a second embodiment cap fitting apparatus designated by the numeral 10A. Safety cap fitting apparatus 10A may be designed to alleviate the problem of having too little space to work with on oil and gas drilling platforms, such as the typical piping system 300 shown in FIG. 1. In this embodiment of FIGS. 12-23, a lance line 16 (see FIGS. 14, 16, 22-23) may connect to housing 41 having an interior 44, outer wall 48, distal end 51, and a proximal end 52. Preferably, a hose stop plate or bushing 43, enables the entry of the lance hose 16 to be in line with the pipe flange 302 or 303 (see FIG. 14). In the example shown, the housing 41 is short (e.g., between 6 and 24 inches) to enable working in a limited space. Prefearbly, the interior 44 of the housing 41 has a diameter of between 2 and 24 inches. However, any suitable size may be used. Proximal end 56 of pipe nipple extension 45 may be attached at a 90-degree angle to the cleanout stem or housing 41 at weld 50 to save space as shown. Pipe nipple extension 45 has an inner bore 54 and outer wall 53, and attaches to housing 41 through weld 50 at its distal end 55, and attaches to discharge camlock 31 at its proximal end 56. Prefearbly, pipe nipple extension 45 is 6 to 24 inches in length and has an interior diameter between 2 and 24 inches. However, any suitable size may be used. Preferably, a discharge camlock 31 may be connected to the distal end 55 of the pipe nipple extension 45 at threaded connection 46. Preferably, the camlock 31 is able to connect to a means for removing discharge from the cleaning process from the pipe nipple extension 45. For example, a catch pan or other container 14 may be attached to or placed below the camlock 31 (see FIG. 4). Preferably, a pump 12 is attached to the camlock 31 with hose 15 in order to pump the discharge away from the limited cleaning area for disposal as was the case with the embodiment of FIGS. 2-11. A range of angles for the pipe nipple extension 45 could be provided, preferably between 0°-90°, and more preferably between about 45°-90°.

Figure 2:
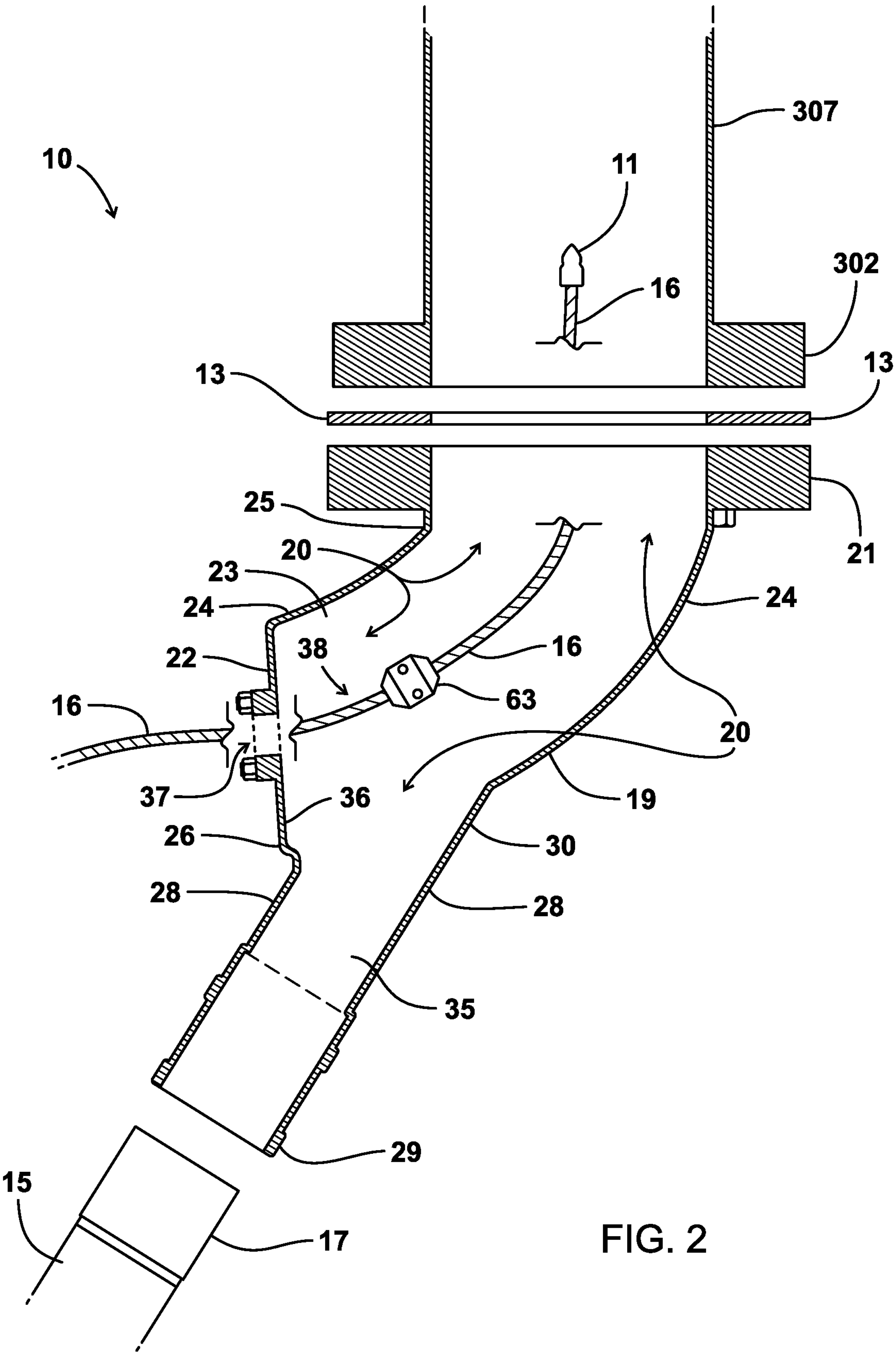
FIG. 2 is a sectional view of a preferred embodiment of the apparatus of the present invention.
Figure 3:
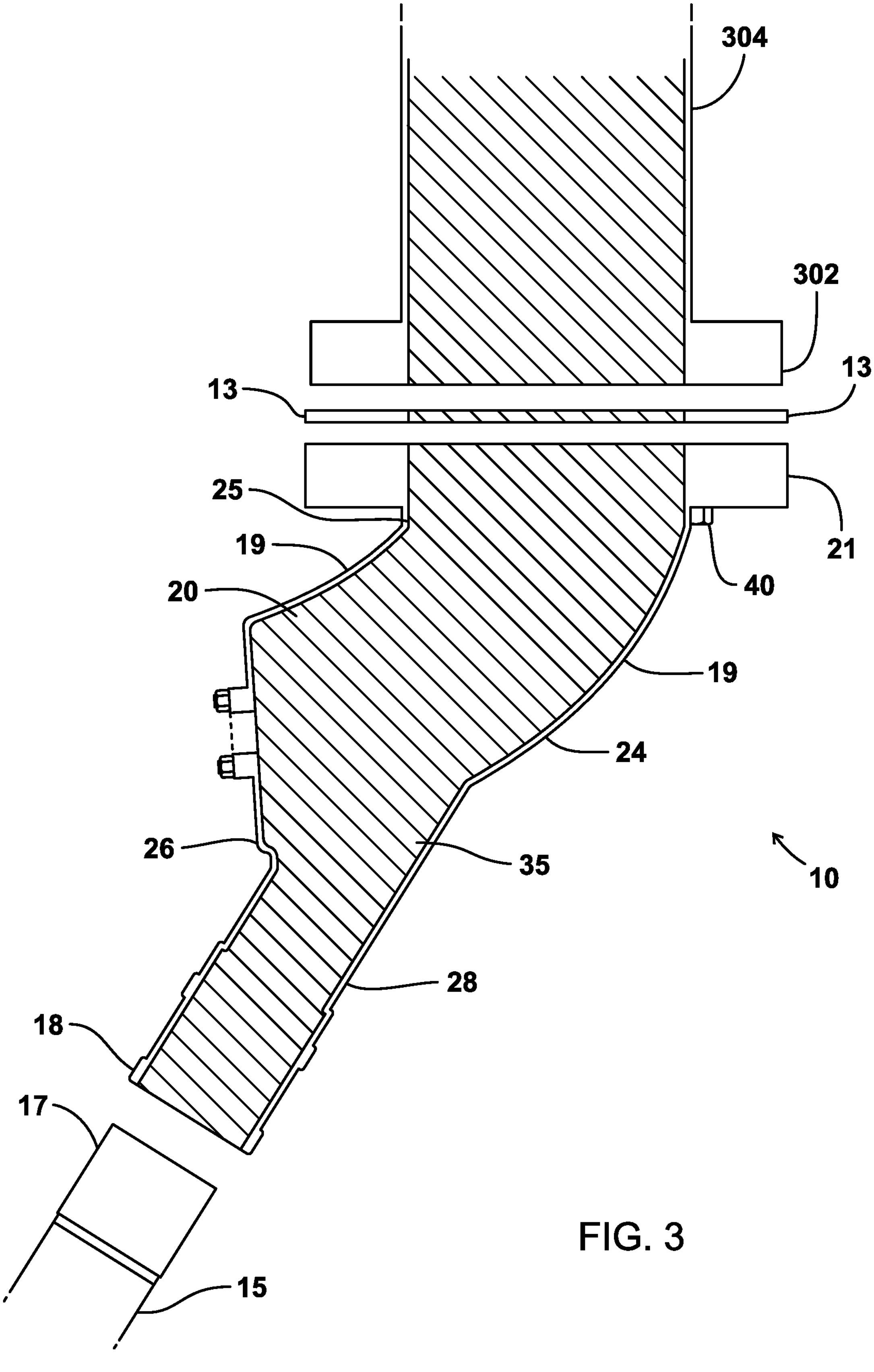
FIG. 3 is a sectional view of a preferred embodiment of the apparatus of the present invention.
Figure 22:
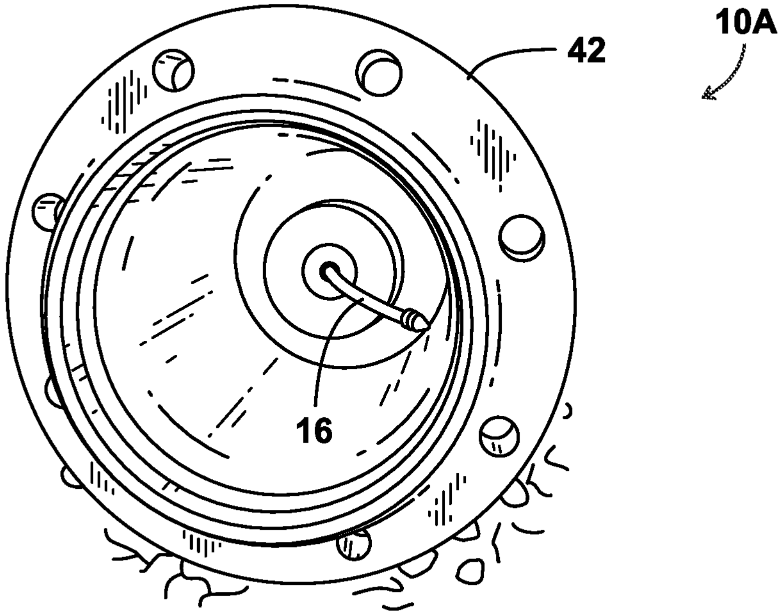
FIG. 22 is a fragmentary view of an alternate preferred embodiment of the apparatus of the present invention.
Figure 23:
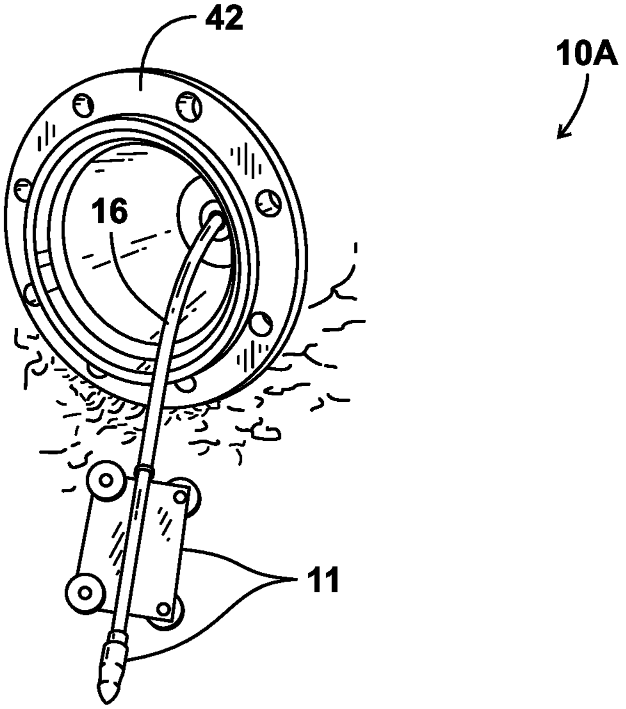
FIG. 23 is a fragmentary view of an alternate preferred embodiment of the apparatus of the present invention.

The safety cap 10 or 10A of the present invention can be used in a method of cleaning piping systems 300 located in hard-to-reach areas or areas with limited space to work in. Preferably, the cleaning method comprises the following steps:

(a) detaching a section of piping 301 or pipe spool piece 301 to allow access to the piping system 300;

(b) threading a high pressure lance line 16 through the small opening at the proximal end of the cleanout stem of the safety cap 10 or 10A (see FIGS. 2, 5, 14, 17 and 22-23);

(c) threading a cleaning tool 11 onto the lance line 16 (see FIGS. 2, and 22-23);

(d) attaching the safety cap fitting 10, 10A to a flange 302, 303, 305, 306 of a pipe 301, 304, 307 in the piping system 300 via the flange adapter 21 or 42 (see FIGS. 2-5, 10, 14, 15 and 17); and, (e) removing fluid and discharge from cleaning operations via the proximal open end of the pipe nipple extension 28 or 45 (see FIG. 4).

Preferably, the small opening 37, 47 at the proximal end of the cleanout stem is of a diameter that a lance line 16 can be placed through the opening 37, 47, but the cleaning tool 11 is too large to fit through the opening 37, 47. Thus, the lance line 16 must be placed through the opening 37, 47 prior to attaching the cleaning tool 11 to the lance line 16. In a preferred embodiment, a hose stop, hose stop plate, or hose bushing 36, 43 is placed at the small opening 37, 47 at the distal end 26, 51 of the cleanout stem or housing 19, 41. The lance line 16 is first threaded through the hose stop opening 37, 47, and then the cleaning tool 11 is attached to the lance line 16. The hose stop 36, 43 further prevents the cleaning tool 11 from being forced backward out of the cleanout stem or housing 19, 41 during cleaning operations.

Preferably, the housing or cleanout stem 19, 41 of the safety cap 10, 10A is shaped to allow access to pipes in hard-to-reach locations with limited space to work in.

Figure 10:
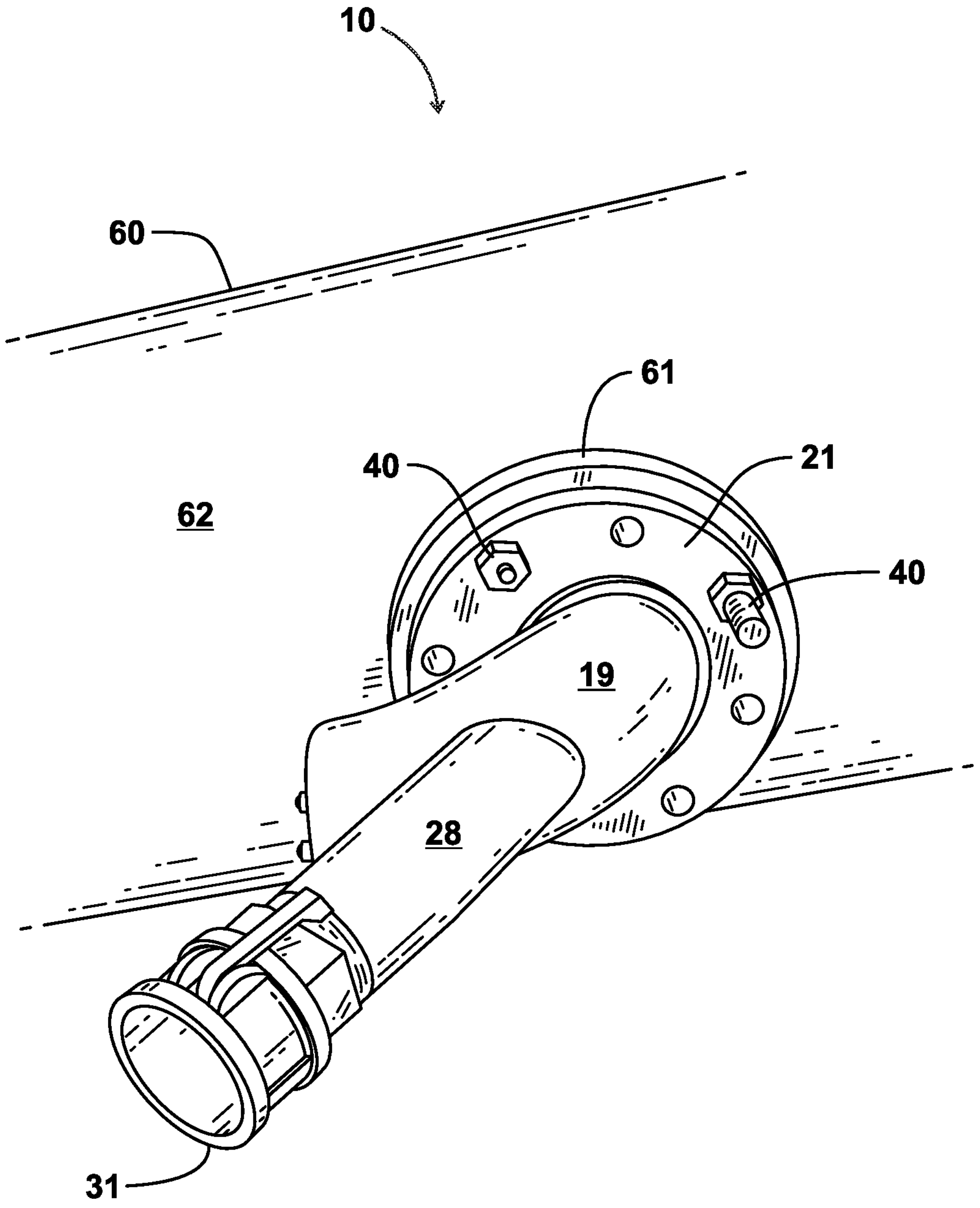
FIG. 10 is a perspective view of a preferred embodiment of the apparatus of the present invention.
Figure 11:
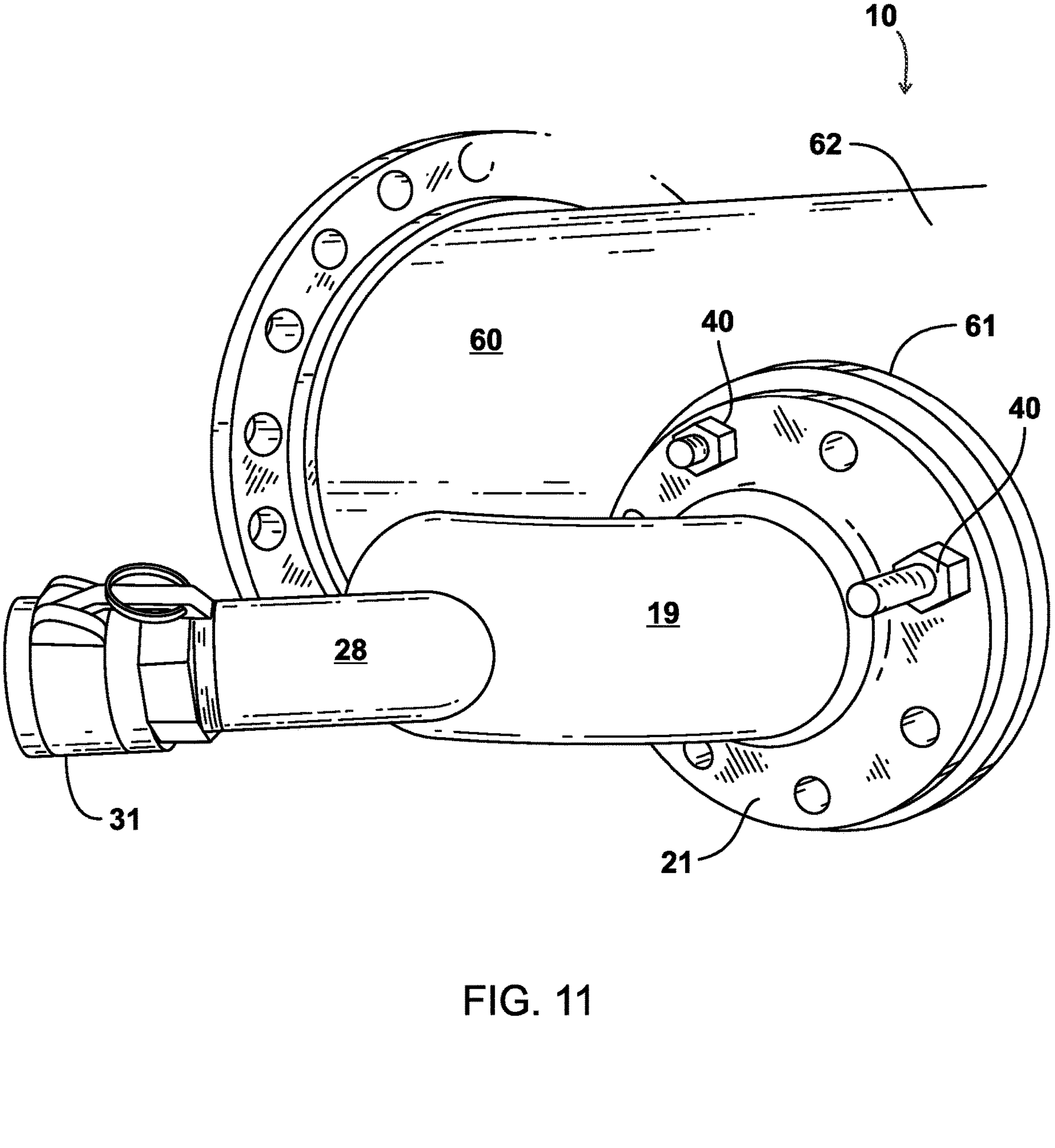
FIG. 11 is a perspective view of a preferred embodiment of the apparatus of the present invention.
Figure 12:
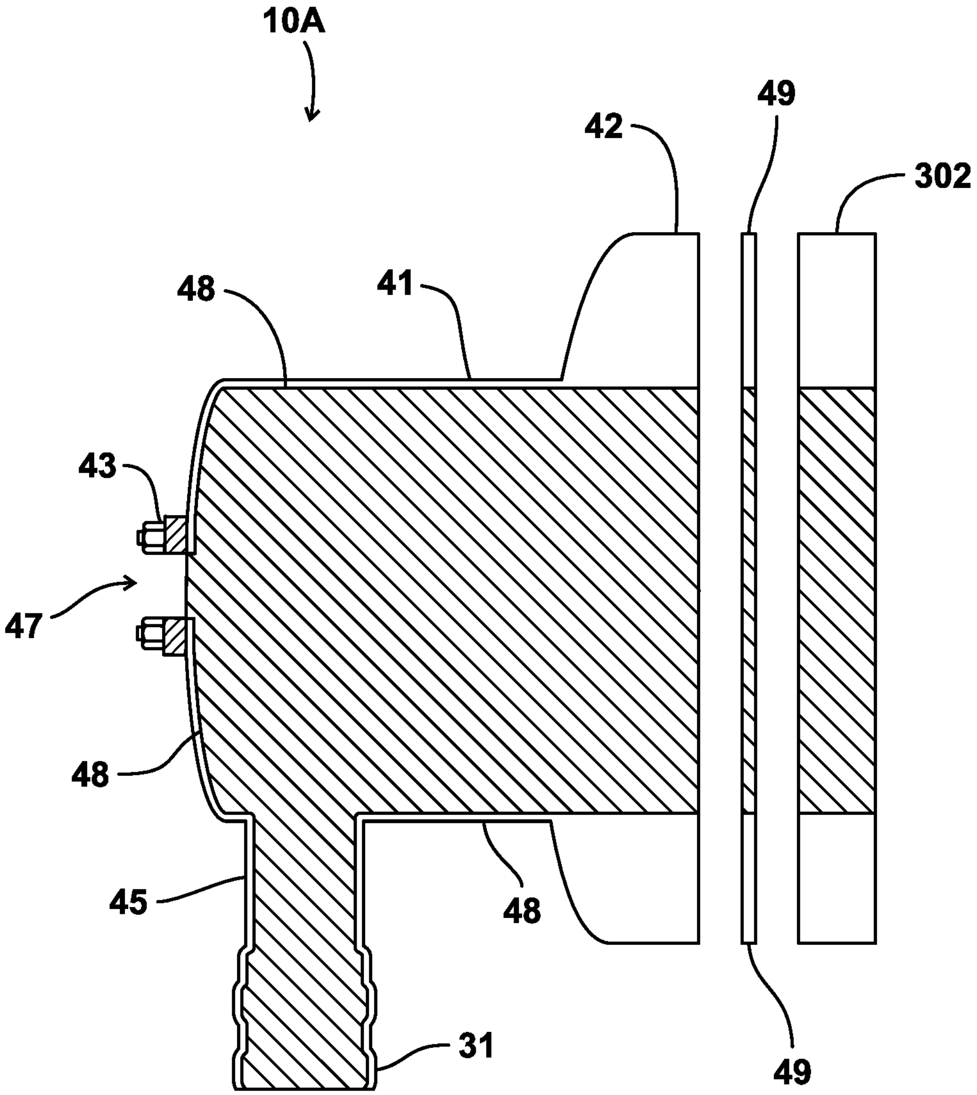
FIG. 12 is a side sectional view of an alternate preferred embodiment of the apparatus of the present invention.
Figure 13:
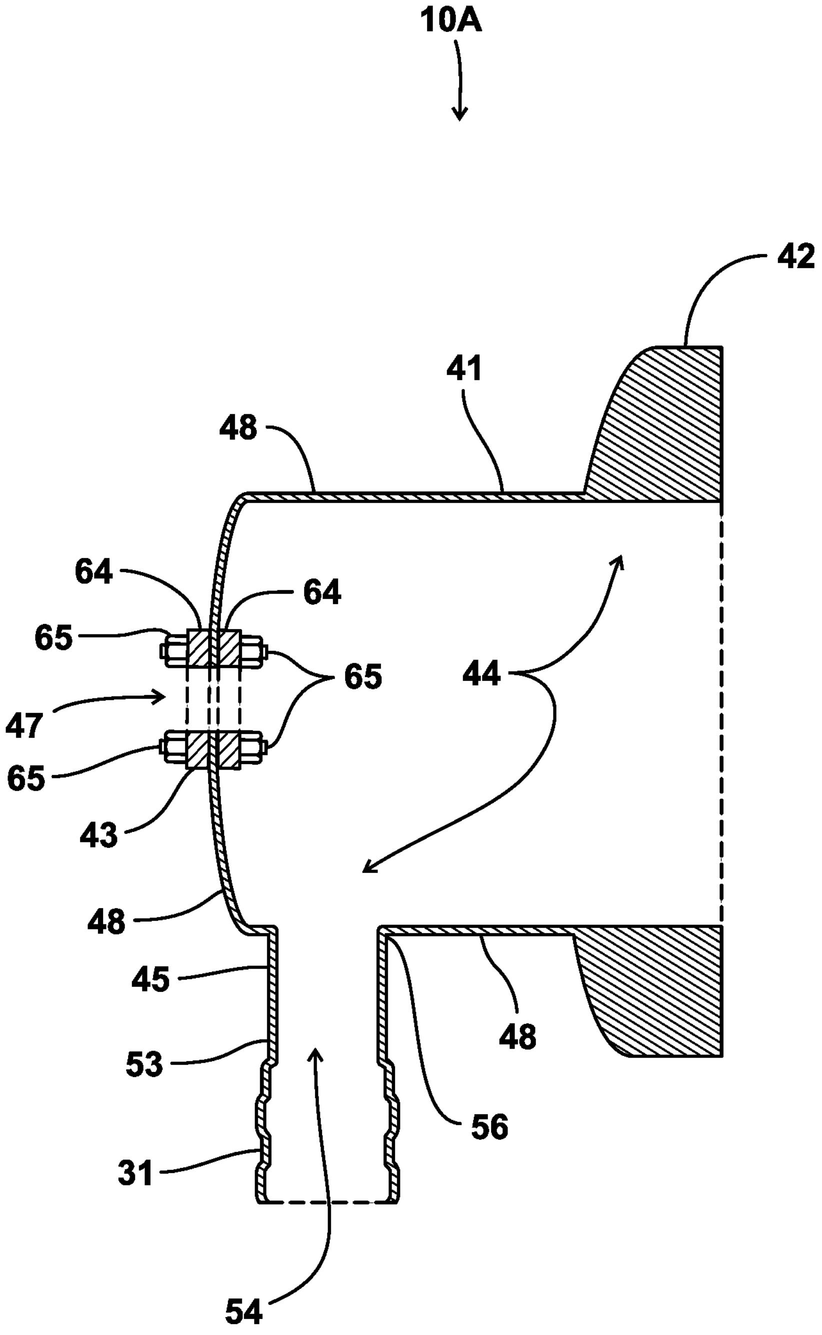
FIG. 13 is a side sectional view of an alternate preferred embodiment of the apparatus of the present invention.
Figure 14:
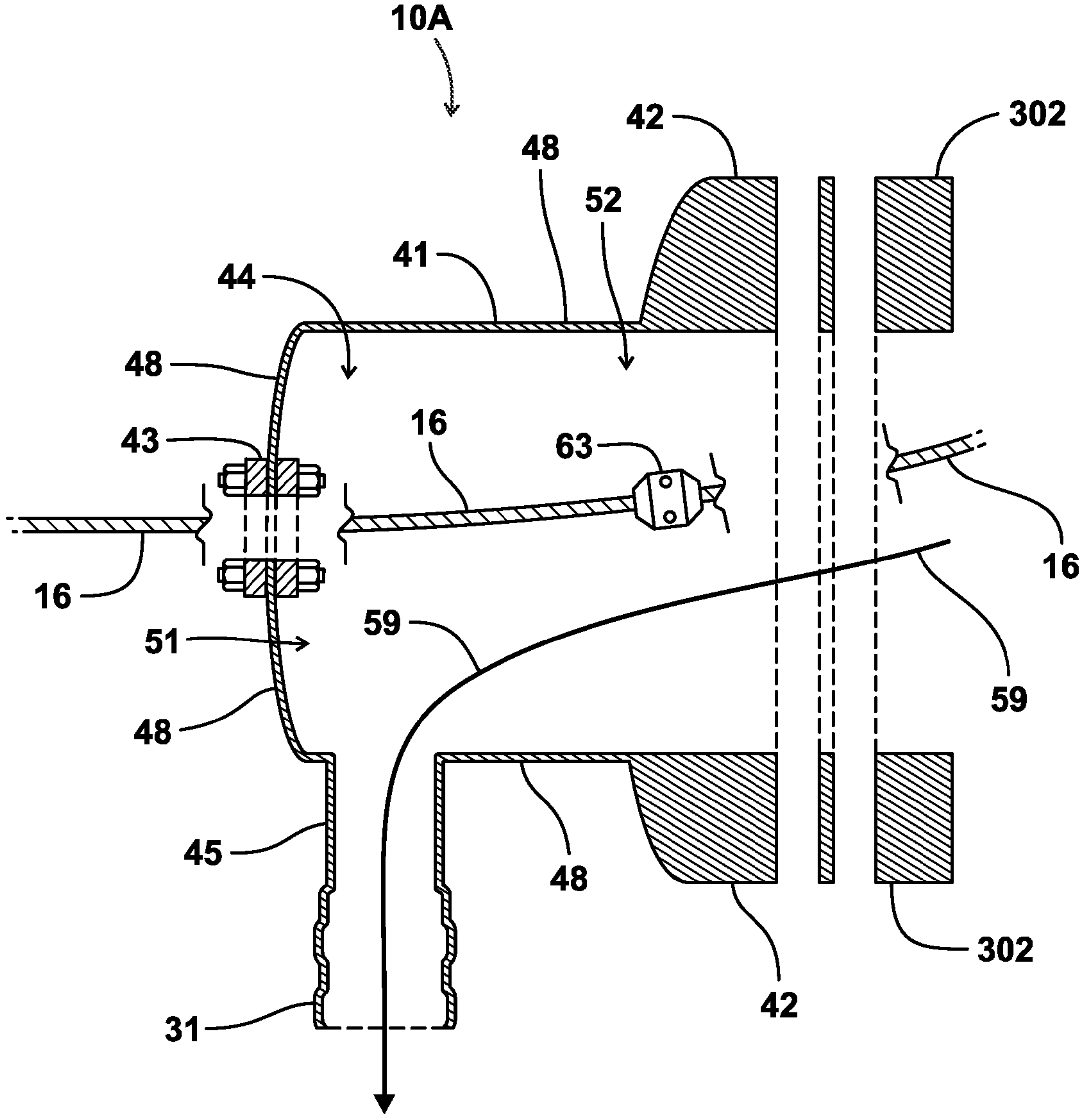
FIG. 14 is a side sectional view of an alternate preferred embodiment of the apparatus of the present invention.
Figure 15:
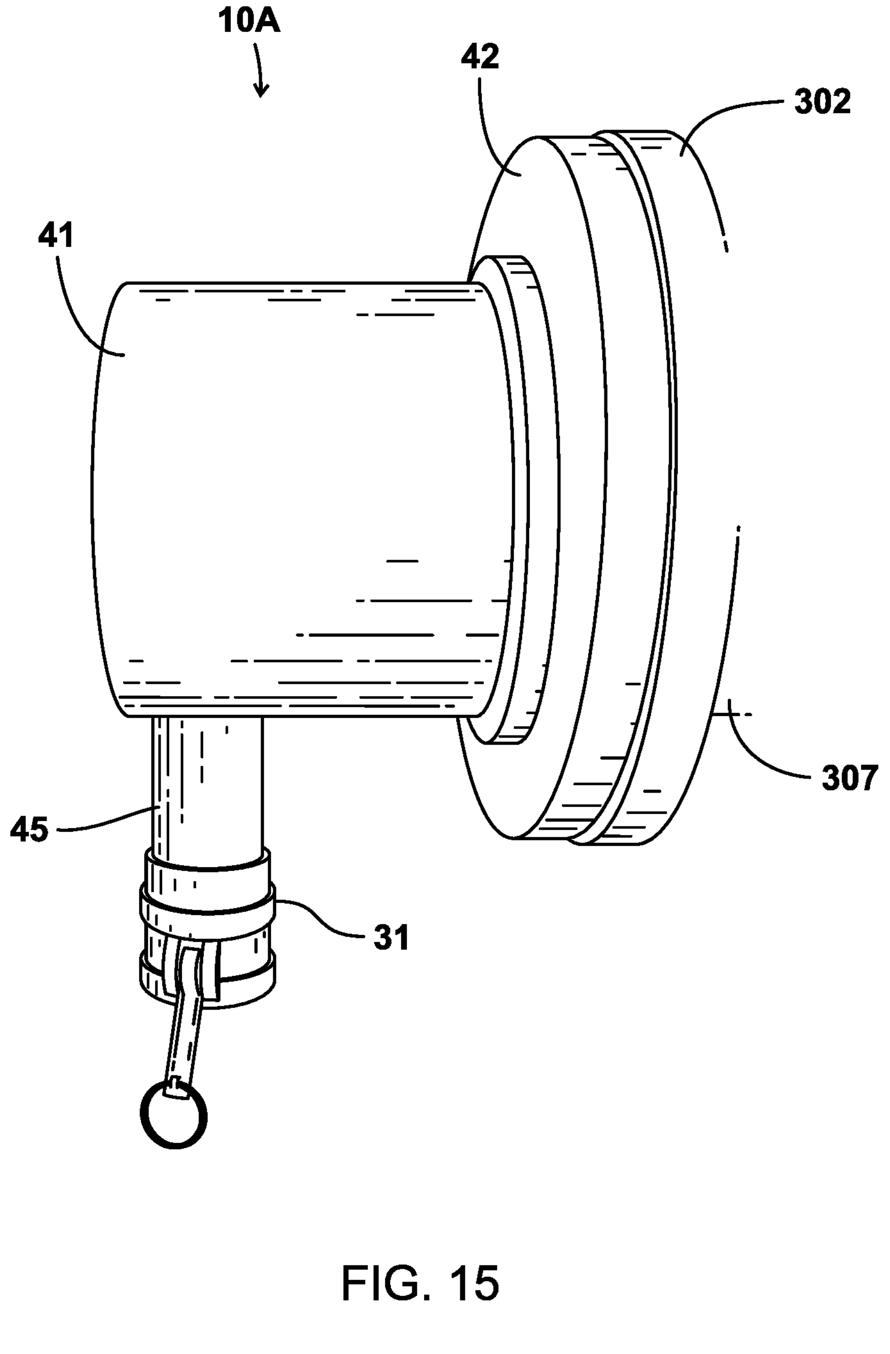
FIG. 15 is a perspective side view of an alternate preferred embodiment of the apparatus of the present invention.
Figure 16:
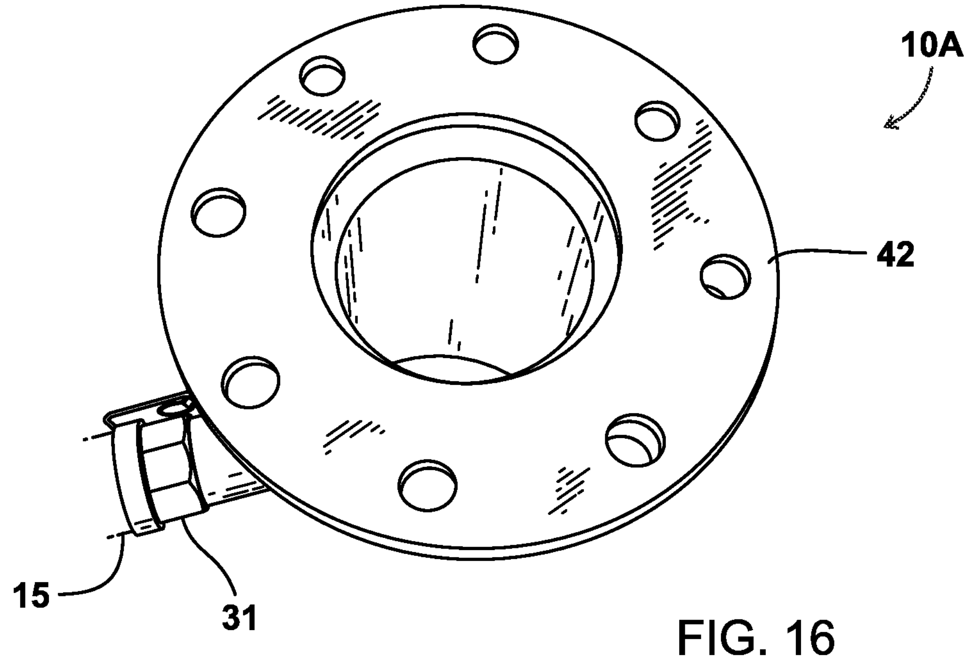
FIG. 16 is a fragmentary view of an alternate preferred embodiment of the apparatus of the present invention.
Figure 17:
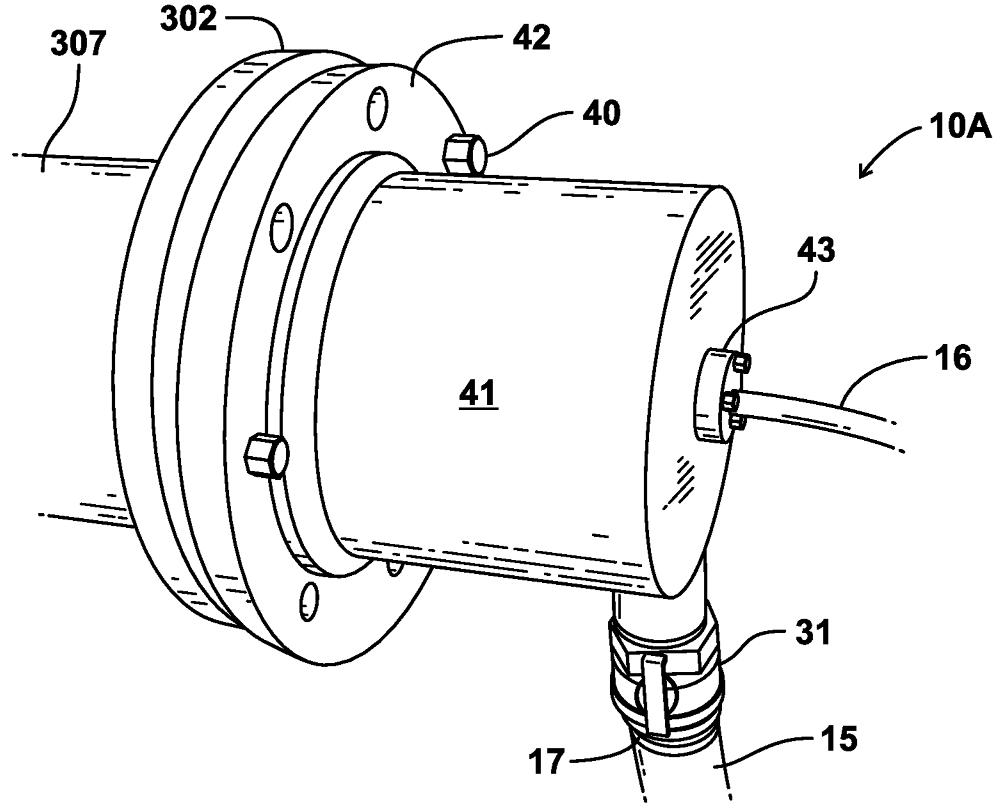
FIG. 17 is a perspective view of an alternate preferred embodiment of the apparatus of the present invention.
Figure 18:
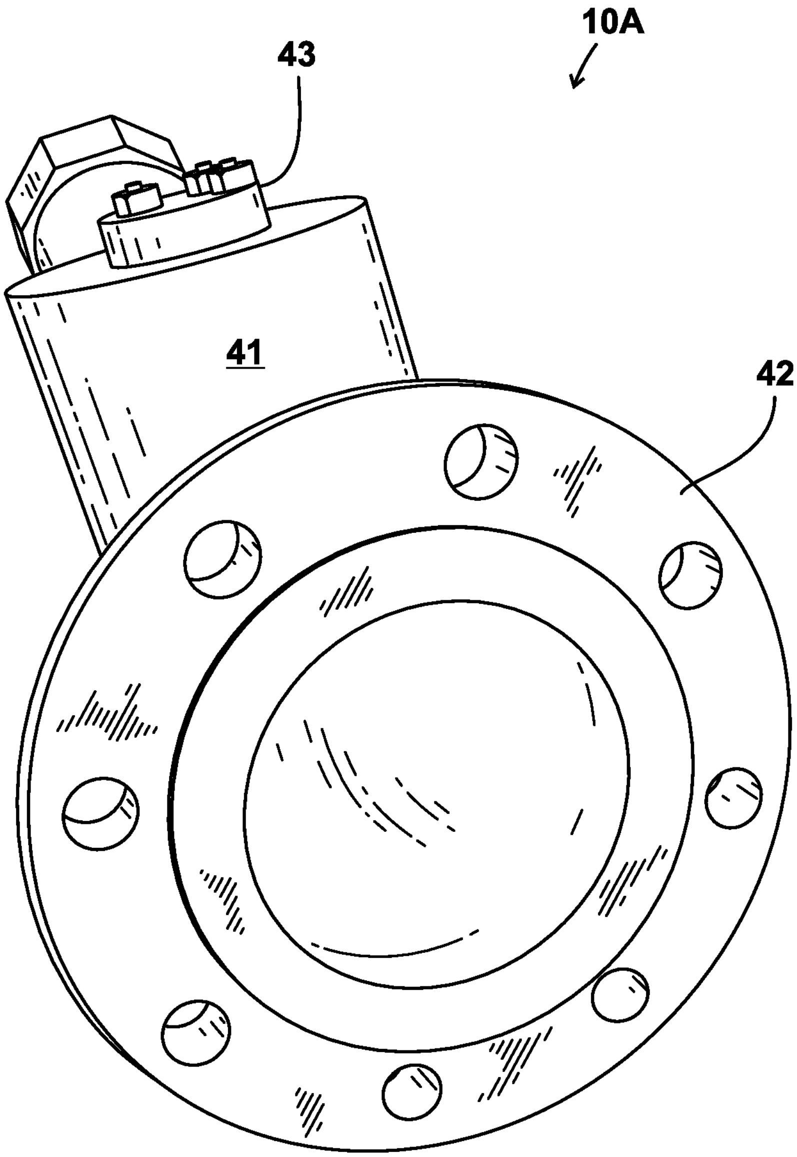
FIG. 18 is a perspective view of an alternate preferred embodiment of the apparatus of the present invention.

Arrows 58, 59 (see FIGS. 5 and 14) indicate schematically that wash fluid and debris that is cleaned from the piping system 300 by cleaning tool 11 and lance line 16, flows from piping system 300 through annular flange/adapter 21 or 42 to interior 20 or 44 of housing 19 or 41 and then to pipe extension 28 or 45 where the wash fluid and debris or cleaned material is pumped via line 15 to a disposal tank (not shown). In FIGS. 10 and 11, adapter 21 or 42 can be attached to a header 60 that has a flange 61 attached to the header side wall 62. Flange 61 would have a central opening that communicates with a bore of header 60 thus enabling a cleaning of the header with lance line 16 and tool 11 via fitting 10 or 10A, housing 19 or 41 and flange/adapter 21 or 42.

The present invention also inclues a method of cleaning a piping system 300 onsite, comprising the steps of:

a) providing a safety cap fitting apparatus 10, 10A, the safety cap fitting apparatus 10, 10A comprising a cleanout stem 19, 41, a pipe flange adapter 21, 42, and a pipe nipple extension 28, 45, wherein the cleanout stem 19, 41 has an outer wall 24, 48, an inner bore 35, 44, a distal end 26, 52 that attaches to the pipe flange adapter 21, 42, a proximal end 26, 51 that has a stem opening 37, 47, and wherein the pipe nipple extension 28, 45 attaches to the outer wall 24, 48 of cleanout stem 19, 41 providing an alternate opening to the inner bore 20, 44 of the cleanout stem, the pipe nipple extension 28, 45 having an outer wall and an inner bore 35, 54, and having a distal end 30, 56 that attaches to the cleanout stem 19, 41, and a proximal end 29, 55 that is open;

b) detaching a section of piping to allow access to the piping system 300;

c) attaching the fitting 10, 10A of step "a" to the piping system 300;

d) threading a high pressure lance line 16 through the stem opening 37, 47 at the proximal end 26, 51 of the cleanout stem 19, 41;

e) affixing a cleaning tool 11 to the lance line 16 of step "d";

f) attaching the safety cap fitting apparatus 10, 10A to a flange 302, 303, 305, 306 of a pipe in the piping system 300 via the flange adapter 21, 42;

g) removing fluid and discharge from cleaning operations via the proximal open end 29, 55 of the pipe nipple extension 28, 45;

h) wherein the cleanout stem 19, 41 is shaped to allow access to pipes in hard-to-reach locations with limited space to work in, and i) wherein the pipe nipple extension 28, 45 is attached to the cleanout stem 19, 41 at an angle that allows access to pipes in hard-to-reach locations with limited space to work in.

In a preferred embodiment, the pipe nipple extension 28, 45 further includes a means for attaching a pump 12 to remove the discharge of step (e), such as a female camlock 31.

Preferably, the cleanout stem 19, 41 further includes a hose bushing 36, 43 at the small opening 37, 47 at the proximal end 26, 51 of the cleanout stem 19, 41, the hose bushing 36, 43 functioning to prevent the cleaning tool 11 from being forced backward out of the piping system 300 during cleaning.

In a preferred embodiment, shown in FIGS. 2-11, the cleanout stem 19 is macaroni shaped, and the pipe nipple extension 28 is attached to the cleanout stem 19 at an angle between 0° and 90°. More preferably, the angle is between 45° and 90°. Preferably, the pipe nipple extension 28 is welded to the cleanout stem 19 at weld 27 as shown in FIG. 4.

In another preferred embodiment, shown in FIGS. 12-23, the cleanout stem 41 is a straight cylinder, attached to the flange adapter 42 at an angle between 45° and 135°, and the pipe nipple extension 45 is attached to the cleanout stem 41 at an angle between 0° and 90°. Preferably, the cleanout stem 41 is attached to the flange adapter 42 at a 90° angle.

In preferred embodiments, the flange adapter 21, 42 connects to the pipe flange 302, 303, 305, 306 via bolts 40. Preferably, a gasket 13, 49 is used between the flange adapter 21, 42 and the pipe flange 302, 303, 305, 306.

The safety cap 10, 10A can be used in cleaning a piping system 300 onsite on an oil and gas drilling platform, or offsite at a cleaning facility using the above methods.

The safety cap fitting apparatus 10, 10A of the present invention preferably comprises:

a flange adapter 21, 42 having a flange central axis;

a cleanout stem 19, 41 connected to the flange adapter 21, 42;

a pipe nipple extension 28, 45 mounted to and extending from the cleanout stem 19, 41;

wherein the pipe nipple extension 28, 45 has a pipe nipple extension central axis that forms an acute angle with the flange central axis;

wherein the cleanout stem 19, 41 has an outer wall 24, 48, an inner bore 38, 44, a distal end 25, 52 that attaches to the flange adapter 21, 42, and a proximal end 26, 51 that has an opening 37, 47; and wherein the pipe nipple extension 28, 45 attaches to the outer wall 24, 48 of cleanout stem 19, 41 providing an alternate opening to the inner bore 38, 44 of the cleanout stem 19, 41, the pipe nipple extension 28, 45 having an outer wall 53, an inner bore 35, 54, a distal end 30, 56 that attaches to the cleanout stem 19, 41, and a proximal end 29, 55 that is an open end.

Preferably, the safety cap 10, 10A further comprises a hose bushing 36, 43 at the proximal end 26, 51 of the cleanout stem 19, 41 for engaging with a high pressure lance line 16 for cleaning.

Figure 7:
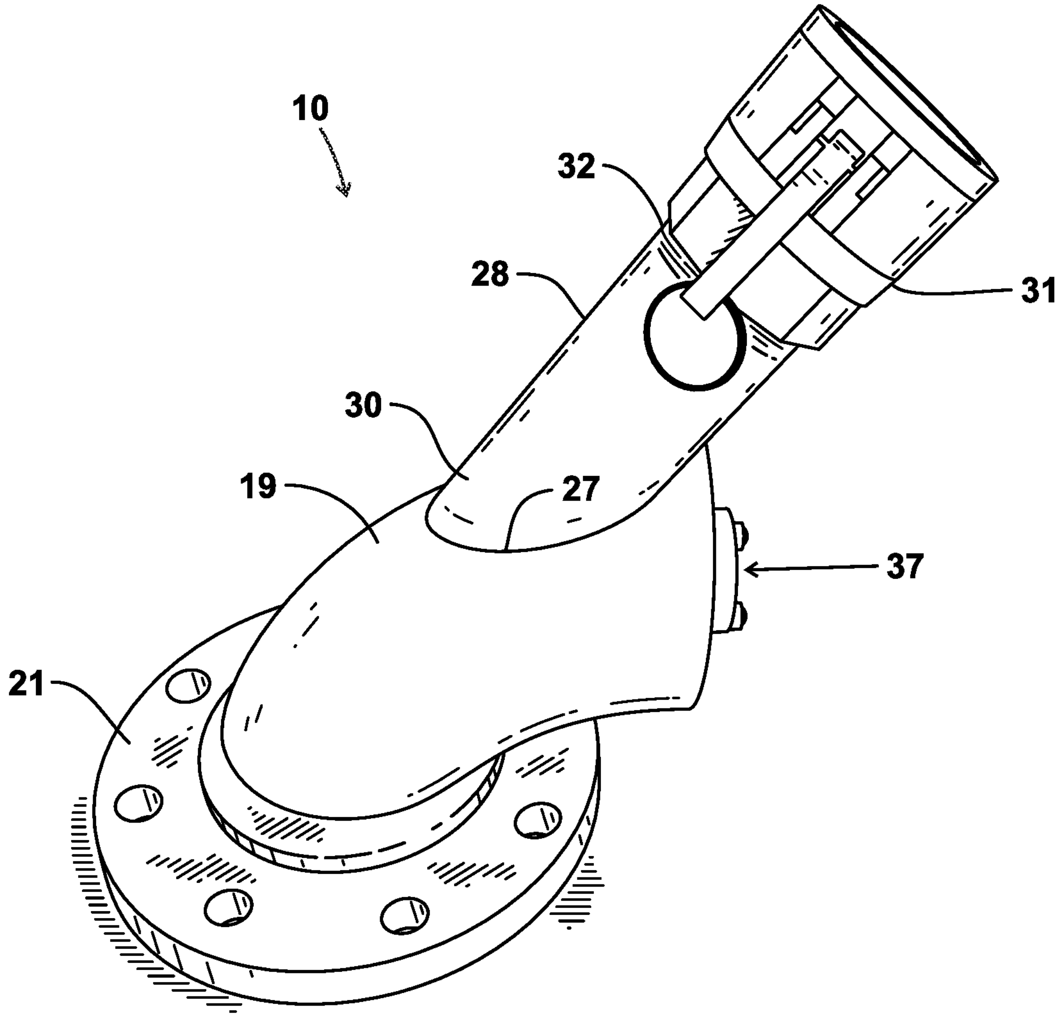
FIG. 7 is a perspective view of a preferred embodiment of the apparatus of the present invention.
Figure 8:
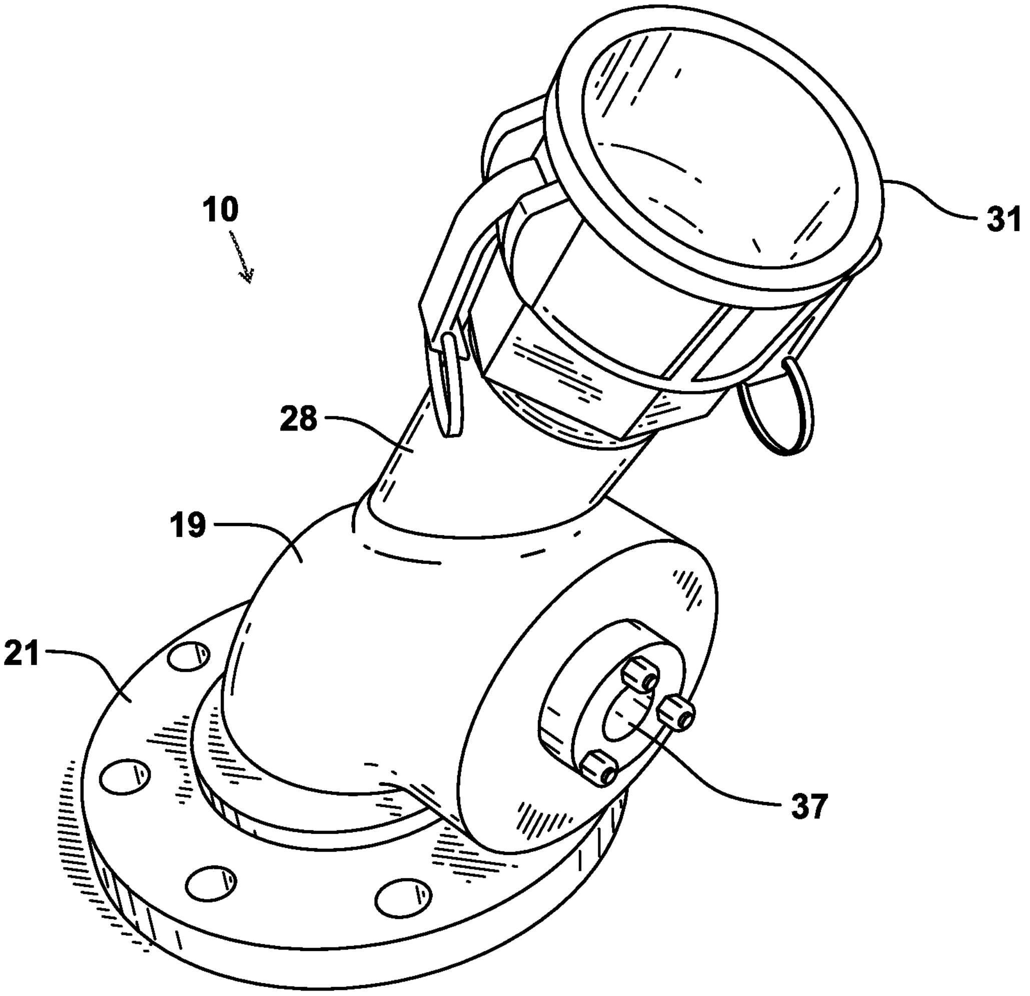
FIG. 8 is a perspective view of a preferred embodiment of the apparatus of the present invention.
Figure 9:
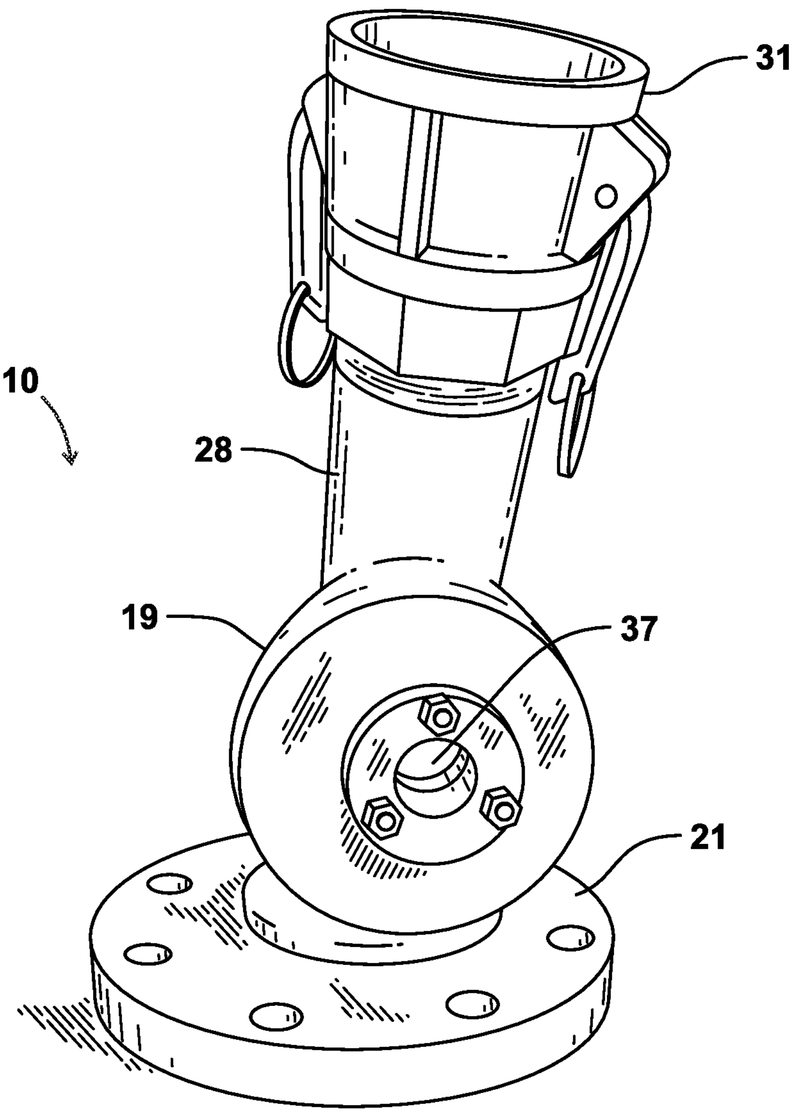
FIG. 9 is a perspective view of a preferred embodiment of the apparatus of the present invention.
Figure 19:
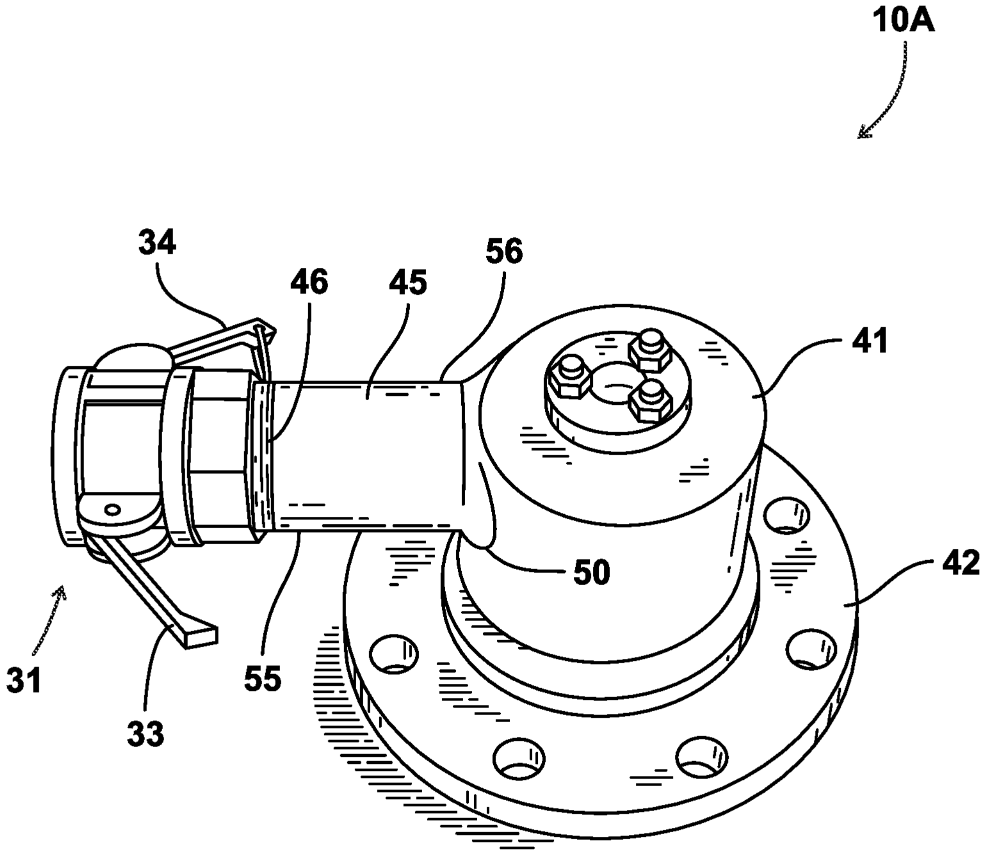
FIG. 19 is a perspective view of an alternate preferred embodiment of the apparatus of the present invention.
Figure 20:
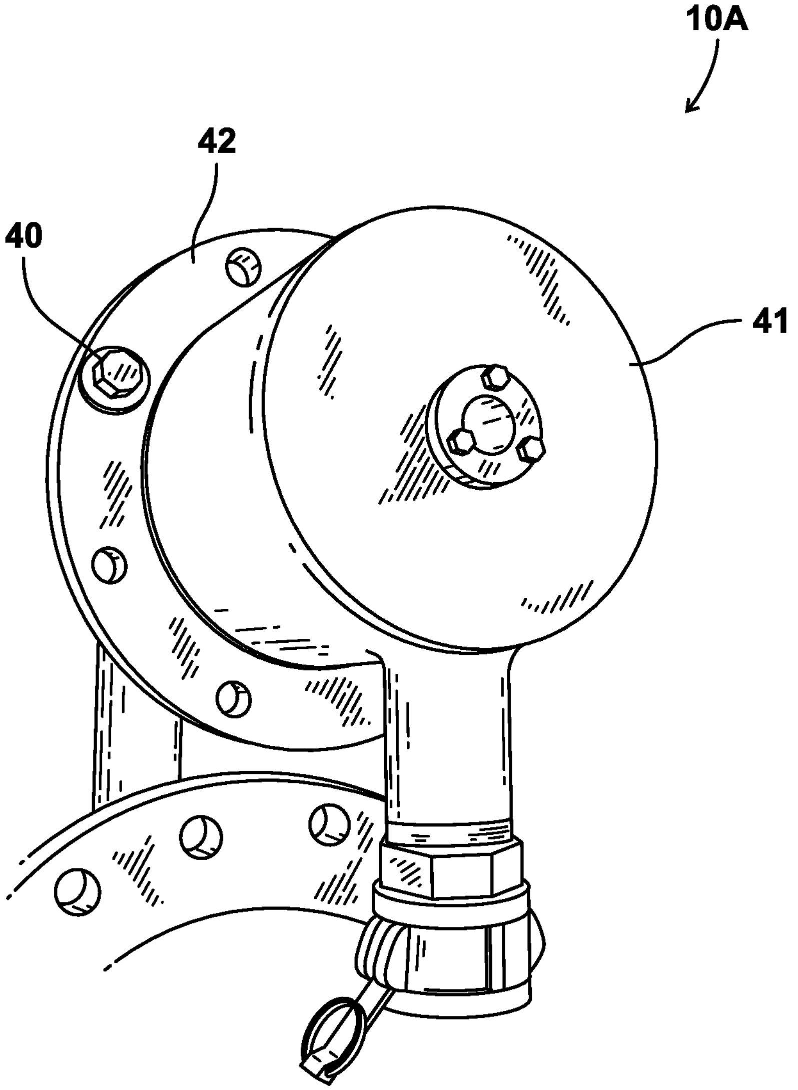
FIG. 20 is a perspective view of an alternate preferred embodiment of the apparatus of the present invention.
Figure 21:
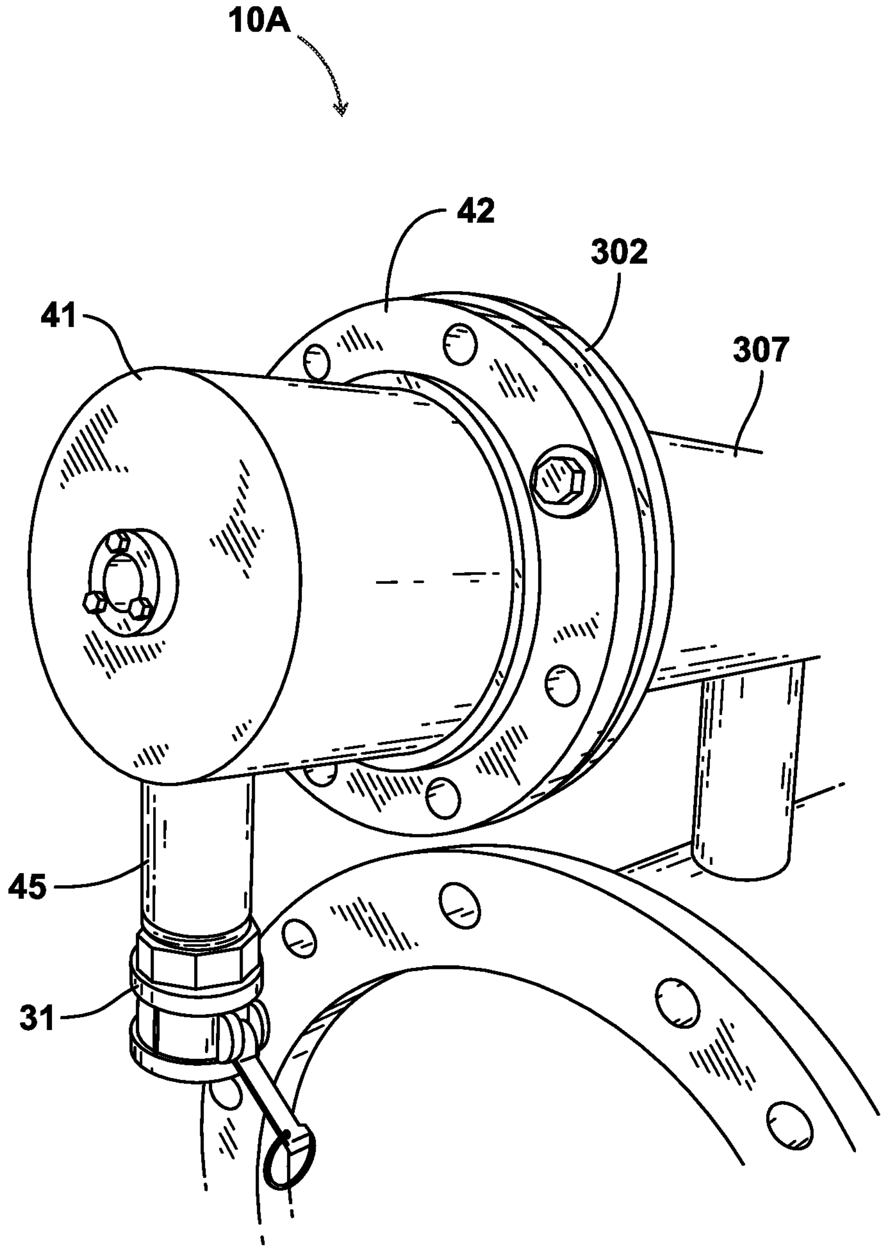
FIG. 21 is a perspective view of an alternate preferred embodiment of the apparatus of the present invention.

More preferably, the cap 10, 10A further comprises a camlock 31 at the proximal end 29, 55 of the pipe nipple extension 28, 45 for engaging with a means for collecting discharge from cleaning. Preferably, the means for collecting discharge is a pump 12, which preferably is connected to the camlock 31 with a hose 15, as shown in FIG. 4. Most preferably, the extension 28, 45 includes a threaded hose connection 32, 46 at the proximal end 29, 55 for connecting a hose 15 as shown in FIGS. 4, 7, and 19. Preferably, the hose 15 is connected to a pump 12 for collecting discharge.

Alternately, the means for collecting discharge can be a container, such as a catch pan 14, also shown in FIG. 4.

Preferably, the cleanout stem 19, 41 is welded to the flange adapter 21, 42, and the pipe nipple extension 28, 45 is welded to the cleanout stem 19, 41 at weld 27, 50.

In a preferred embodiment shown in FIGS. 1-11, the cleanout stem 19 is macaroni shaped, and the pipe nipple extension 28 is attached to the cleanout stem 19 at an acute angle, preferably between 0° and 90°. More preferably, the angle is between 45° and 90°.

In another preferred embodiment shown in FIGS. 12-23, the cleanout stem 41 is a straight cylinder, attached to the flange adapter 42 at an angle between 45° and 135°, and the pipe nipple extension 45 is attached to the cleanout stem 42 at an angle between 0° and 90°. More preferably, the cleanout stem 41 is attached to the flange adapter 42 at a 90° angle.

Preferably, the flange adapter 21, 42 includes a flange having multiple bolt circle openings and a central flange opening, allowing the cap 10, 10A to attached to a flange 302, 303, 305, 306 of the pipe system 300 via the flange adapter 21, 42 using a bolted connection 40.

PARTS LIST:
The following is a list of parts and materials suitable for use in the present invention:

| Parts Number | Description |
|---|---|
| 10 | safety cap fitting apparatus |
| 10A | safety cap fitting apparatus |
| 11 | cleaning tool |
| 12 | pump |
| 13 | gasket/ring type gasket |
| 14 | catch pan/container |
| 15 | transfer hose |
| 16 | lance line |
| 17 | male coupler/fitting |
| 18 | female coupler/female camlock connection |
| 19 | housing/body |
| 20 | cavity/interior/bore/hollowed portion |
| 21 | flange/adapter/pipe flange |
| 22 | proximal end portion |
| 23 | catch/catch section/catch cylinder |
| 24 | outer wall |
| 25 | distal end portion |
| 26 | proximal end portion |
| 27 | weld |
| 28 | pipe nipple/pipe section/tubular extension |
| 29 | proximal end portion |
| 30 | distal end portion |
| 31 | camlock fitting |
| 32 | threaded connection |
| 33 | camlock ear |
| 34 | camlock ear |
| 35 | bore |
| 36 | hose stop plate/bushing |
| 37 | opening |
| 38 | bore/interior |
| 39 | lance line feed device |
| 40 | bolts/bolted connections |
| 41 | housing/cleanout stem |
| 42 | flange adapter |
| 43 | hose stop bushing |
| 44 | housing interior |
| 45 | pipe nipple extension |
| 46 | threaded connection |
| 47 | opening |
| 48 | housing wall |
| 49 | gasket |
| 50 | weld |
| 51 | proximal end of cleanout stem |
| 52 | distal end of cleanout stem |
| 53 | outer wall of pipe nipple extension |
| 54 | inner bore of pipe nipple extension |
| 55 | proximal end of pipe nipple extension |
| 56 | distal end of pipe nipple extension |
| 57 | arrows |
| 58 | arrow |
| 59 | arrow |
| 60 | header |
| 61 | flange |
| 62 | side wall |
| 63 | hose stop |
| 64 | hose stop bushing plate |
| 65 | hose stop bushing bolt |
| 300 | piping system |
| 301 | spool piece |
| 302 | flange/pipe flange |
| 303 | flange/pipe flange |
| 304 | pipe section/tubular |
| 305 | flange/pipe flange |
| 306 | pipe flange |
| 307 | pipe section/tubular |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only: the scope of the present invention is to be limited only by the following claims.

The invention claimed is:

1. A safety cap fitting apparatus for use in cleaning a piping system, the apparatus comprising:

a) a housing having a hollow bore;

b) a flange adapter on said housing, the flange adapter having a flange adapter central axis; and c) a pipe nipple extension mounted to and extending from the housing;

wherein the pipe nipple extension has a pipe nipple extension central axis that forms an angle with the flange adapter central axis;

wherein the housing has an outer wall, a distal end that attaches to the flange adapter, and a proximal end that has an opening to the hollow bore; and wherein the pipe nipple extension attaches to the housing providing a second opening to the hollow bore, the pipe nipple extension having an outer wall, an inner bore, a distal end that attaches to the housing, and a proximal end that is an open end.

2. The safety cap fitting apparatus of claim 1 further comprising a hose bushing at the proximal end of the housing for engaging with a high pressure lance line for use in cleaning the piping system.

3. The safety cap of claim 1 further comprising a camlock fitting at the proximal end of the pipe nipple extension for engaging with a flow line that collects discharge fluid from the cleaning of the piping system.

4. The safety cap of claim 3 wherein the flow line connects to a pump.

5. The safety cap of claim 3 wherein discharge fluid is collected in a container.

6. The safety cap of claim 1 wherein the housing is welded to the flange adapter, and the pipe nipple extension is welded to the housing.

7. The safety cap of claim 1 wherein the housing includes a straight tubular section attached to the flange adapter at an angle between 45° and 135°, and the pipe nipple extension is attached to the housing at an angle of between 0° and 90°.

8. The safety cap of claim 7 wherein the housing is attached to the flange adapter at a 90° angle.

9. The safety cap fitting apparatus of claim 1 further comprising a hose fitting at the proximal end of the pipe nipple extension for engaging with a high pressure lance line for cleaning of the piping system.

10. The safety cap of claim 1 further comprising a fitting at the proximal end of the pipe nipple extension for engaging with a discharge hose.

11. The safety cap of claim 10 wherein the hose connects to a pump.

12. The safety cap of claim 10 wherein the housing and pipe nipple are welded together.

13. The safety cap of claim 1 wherein the housing is welded to the flange adapter.

14. The safety cap of claim 1 wherein the pipe nipple extension is attached to the housing at an angle of between 0° and 90°.

15. The safety cap of claim 14 wherein the angle is between 45° and 90°.

16. The safety cap of claim 1 wherein the housing includes a straight tubular section attached to the flange adapter and the pipe nipple extension is attached to the housing at an angle between 0° and 90°.

* * * * *